No. 754,421. PATENTED MAR. 15, 1904.
C. BUTCHER.
POST HOLE DIGGER.
APPLICATION FILED DEC. 15, 1903.
NO MODEL.
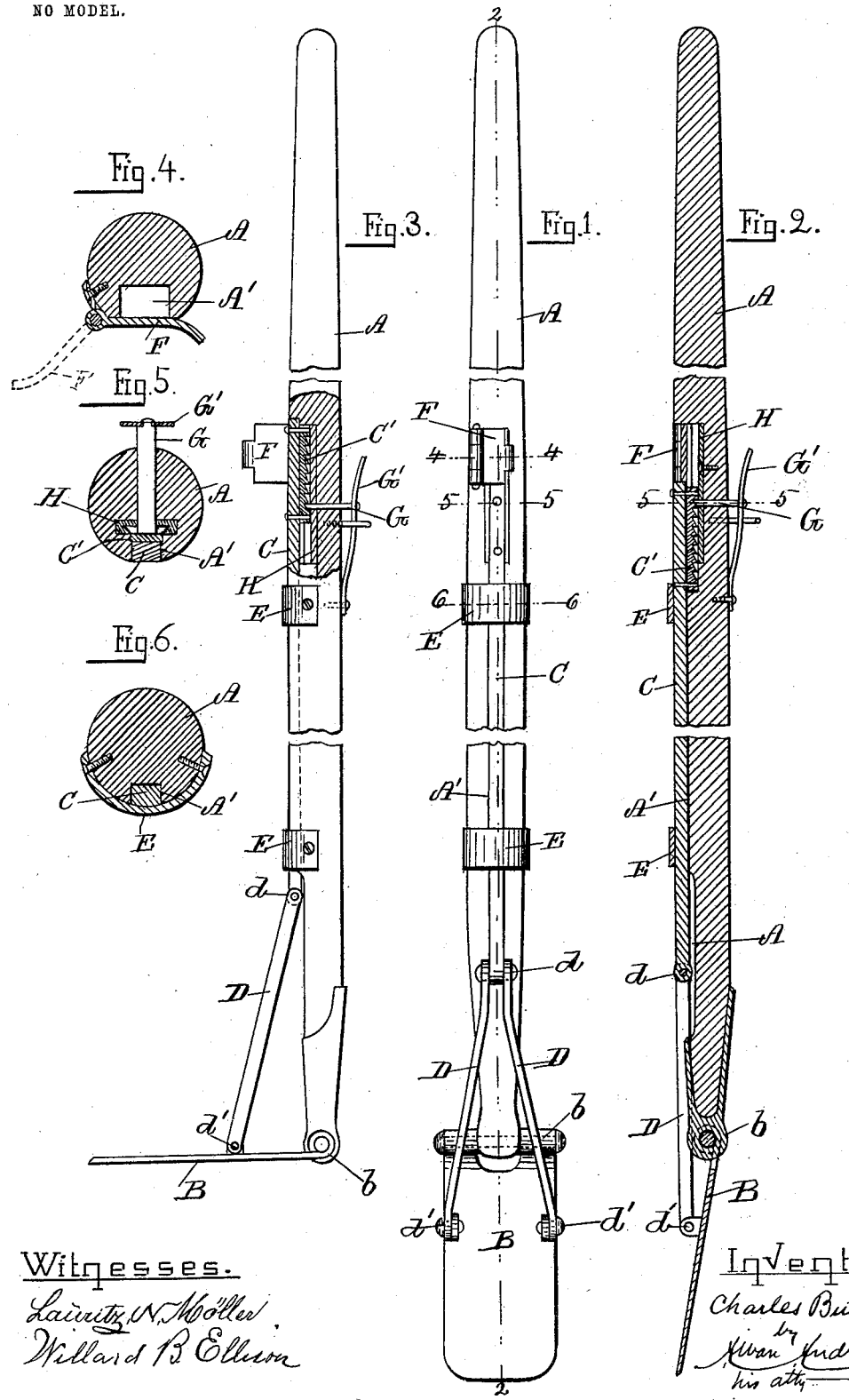

No. 754,421. Patented March 15, 1904.

UNITED STATES PATENT OFFICE.

CHARLES BUTCHER, OF CAMBRIDGE, MASSACHUSETTS.

POST-HOLE DIGGER.

SPECIFICATION forming part of Letters Patent No. 754,421, dated March 15, 1904.

Application filed December 15, 1903. Serial No. 185,255. (No model.)

*To all whom it may concern:*

Be it known that I, CHARLES BUTCHER, a citizen of the United States, and a resident of Cambridge, in the county of Middlesex and State of Massachusetts, have invented certain new and useful Improvements in Post-Hole Diggers, of which the following is a specification.

This invention relates to improvements on that class of post-hole diggers in which the scoop or blade is pivoted to the lower end of the handle and adapted to be swung from substantially a vertical to a horizontal position during the operation of digging a post-hole, whereby the earth may be readily removed without the need of unnecessarily enlarging the hole for the reception of the post to be placed therein, as will hereinafter be more fully shown and described, reference being had to the accompanying drawings, wherein—

Figure 1 is a front elevation of the device, showing the blade substantially in alinement with the handle. Fig. 2 is a central longitudinal section on the line 2 2 shown in Fig. 1. Fig. 3 is a side elevation of the device, showing the blade held at about a right angle relative to the handle during the removal of the earth from the post-holes, parts of said figure being shown in section for the better illustration of the construction of the device. Fig. 4 is an enlarged cross-section on the line 4 4 shown in Fig. 1. Fig. 5 is an enlarged cross-section on the line 5 5 shown in Fig. 1, and Fig. 6 is an enlarged cross-section on the line 6 6 shown in Fig. 1.

Similar letters refer to similar parts wherever they occur on the different parts of the drawings.

In the drawings, A represents a handle of suitable size and length, to the lower end of which is pivoted at $b$ a shovel or blade B of any desired form or size, as shown. On one side of the handle is located a longitudinally-adjustable bar or rod C, the lower end of which is pivotally connected at $d$ to links D D, having their lower ends pivoted at $d'$ $d'$ to the blade or shovel B, as shown.

In practice I make a longitudinal groove A' on one side of the handle A, in which the rod or bar C is guided.

E E are bands, caps, or clips secured to the handle A for the purpose of preventing the rod or bar C from getting detached from the handle during the longitudinal adjustment of said bar.

For the purpose of holding the blade or shovel B in alinement, or nearly so, with the handle while inserting the said blade into the earth I provide the handle preferably with a hinged stop projection or abutment F, arranged on the said handle at the upper end of the rod C, which stop projection when held in the position shown in the Figs. 1, 2, and 4 serves to prevent upward movement of the rod C, and consequently serves to hold the blade or shovel substantially in alinement with the handle A.

At the upper end of the bar or rod C is secured or made integral therewith a toothed rack C', the teeth of which are normally held in engagement with a spring-pressed pawl G, passing through a perforation in the handle A and having its outer end attached to a spring-plate G', as shown.

In practice I make the rack C' dovetailed in section and adapted to slide in a correspondingly-shaped guide H, secured to the handle A, as shown in Figs. 2, 3, and 5.

In using the device I first swing the blade or shovel B to the position shown in Figs. 1 and 2 and lock it in such position relative to the handle by swinging the stop projection F to the position shown in Figs. 1, 2, and 4, causing the upper end of the movable bar C to abut against the under side of the projection F, and thus preventing upward movement of said bar C and turning of the shovel as long as said stop projection is closed. The device in such locked condition is substantially rigid and can be used as an ordinary spade and forced into the ground to the desired depth. The stop F is then swung outward and released from the upper end of the bar C, as shown in Fig. 3 and dotted lines in Fig. 4.

While the blade is in the ground the handle A is rocked by the operator forward and back, causing the rack C' to interlock with the yielding pawl G and causing the blade B to be held at an angle relative to the handle until by repeated rocking of said handle the blade assumes the position shown in Fig. 3 and caused to be held locked in such position by the engagement of said pawl with the rack C', when the earth resting on the now horizontal blade may readily be raised by moving the handle upward and discharged in any convenient place. The rack C' is then disengaged from the pawl G by pushing the spring G' outward from the handle and swinging the blade B to the position shown in Figs. 1 and 2, after which the lock projection F is swung to the closed position shown in Figs. 1, 2, and 4, when the operation is repeated until the post-hole is dug to the desired depth.

The blade or shovel may be made of any desired size and shape, according to the size of the hole that is to be made, and it may be made flat or scoop-shaped, as may be desired, without departing from the essence of my invention.

Having thus fully described the nature, construction, and operation of my invention, I wish to secure by Letters Patent and claim—

In combination with a handle A and a shovel B, pivotally connected to the lower end of said handle, a longitudinally-movable rod C, guided on and adjustable relative to said handle, links pivoted intermediate said rod and shovel, a toothed rack on the upper end of said rod, a spring-pressed pawl engaging said rack, and an adjustable stop projection F, arranged on the handle adjacent to the upper end of the movable rod C, and means for disengaging said pawl from the rack, substantially as and for the purpose set forth.

In testimony whereof I have affixed my signature in presence of two witnesses.

CHARLES BUTCHER.

Witnesses:
ALBAN ANDRÈN,
LAURITZ N. MÖLLER.